Sept. 2, 1969  J. W. CRANE ET AL  3,464,346
HAY BALER

Filed May 26, 1967  3 Sheets-Sheet 1

INVENTORS
JACK W. CRANE
EDWIN B. NOLT &
WILLIAM E. JAMES
BY
ATTORNEY

Sept. 2, 1969     J. W. CRANE ET AL     3,464,346
HAY BALER
Filed May 26, 1967     3 Sheets-Sheet 2
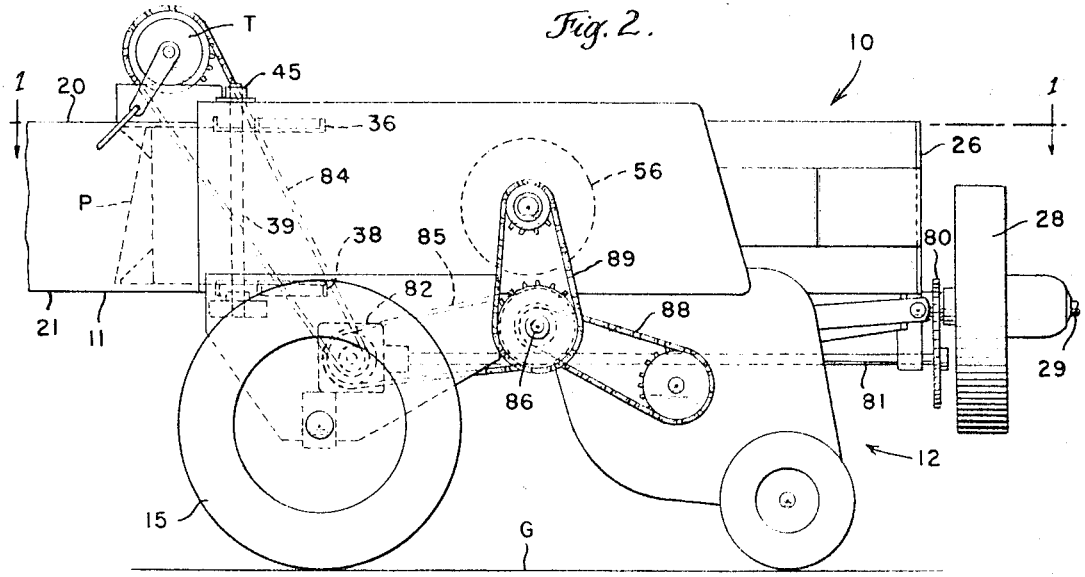
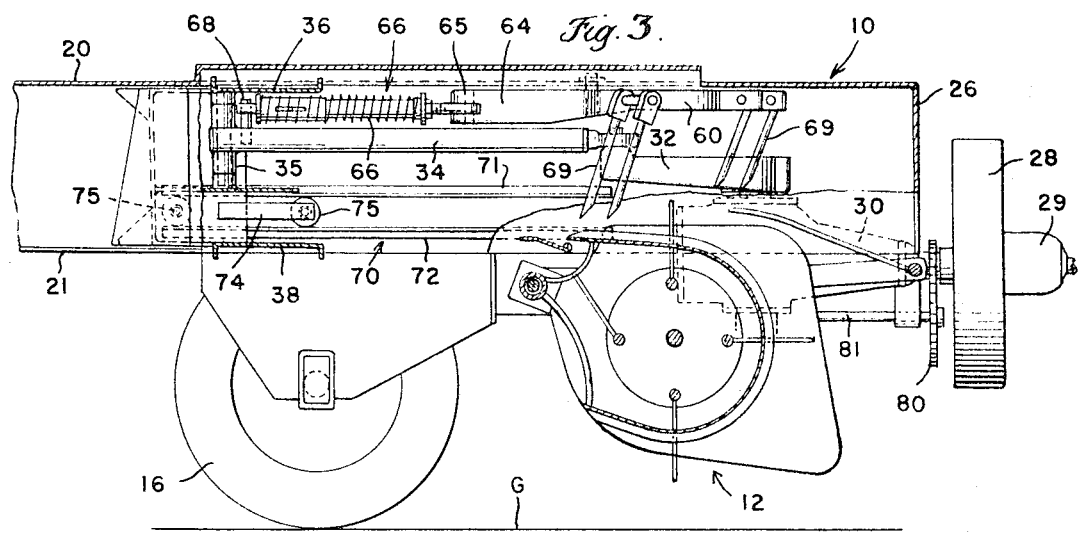
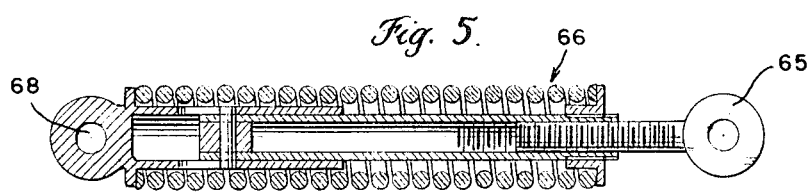
INVENTORS
JACK W. CRANE
EDWIN B. NOLT &
WILLIAM E. JAMES
BY *Joseph A. Brown*
ATTORNEY

INVENTORS
JACK W. CRANE
EDWIN B. NOLT &
WILLIAM E. JAMES

BY Joseph A. Brown
ATTORNEY

United States Patent Office 3,464,346
Patented Sept. 2, 1969

3,464,346
HAY BALER
Jack W. Crane and Edwin B. Nolt, New Holland, Pa., and William E. James, Dijon, France, assignors to Sperry Rand Corporation, New Holland, Pa., a corporation of Delaware
Filed May 26, 1967, Ser. No. 641,551
Int. Cl. A01f *15/02;* B30b *1/06, 9/50*
U.S. Cl. 100—142                              12 Claims

ABSTRACT OF THE DISCLOSURE

A hay baler having a horizontally extending bale case in which a plunger is reciprocal, said plunger oscillating on an arc about the axis of a vertical pivot pin.

Background of invention

In a hay baler, ordinarily the bale case extends horizontally in a fore-and-aft direction relative to ground travel. Hay is fed into the bale chamber through a side wall opening and a reciprocating plunger travelling in a straight line compressess the delivered hay into bales. Conventionally, the plunger is supported by a track-roller structure so that it reciprocates in a given linear path. The plunger is driven by a crank arm which rotates in a vertical plane about a transverse horizontal axis. The crank arm is pivotally connected to a connecting rod and such rod is in turn pivotally connected to the plunger. Such arrangement is shown for example in U.S. Patent No. 3,059,569.

In such baler structure, the driving force on the plunger subjects it to both upward and downward loads tending to rock the plunger relative to the bale case in which it travels. The tracks on the bale case and the rollers on the plunger must be of high quality to provide long operative lives of these components under the loads and heavy use of the baler. Although this construction is desirable and suitable from the functional standpoint, it is relatively expensive.

Summary of the invention

The main object of this invention is to provide a hay baler in which the plunger is mounted by novel means whereby it is not subjected to the normal upward and downward rocking loads directed against the plunger of a conventional baler.

Another object of this invention is to provide a baler plunger arrangement wherein track and roller means are merely relegated to the function of supporting the plunger and not to guiding it.

Another object of this invention is to provide a hay baler plunger of the character described in which simple means is provided for establishing proper operating clearance between the knife carried on the plunger and the shear bar mounted on the baler bale case.

A further object of this invention is to provide a baler plunger which is driven by forces operating in a horizontal plane rather than in a vertical plane.

A still further object of this invention is to provide a baler plunger of the character described which has a low mass whereby it can be operated at high speed and the plunger structure being such that it can be manufactured at low cost.

Other objects of this invention will be apparent hereinafter from the specification and from the recital in the appended claims.

Brief description of the drawings

FIG. 2 is a side elevation of FIG. 1;

FIG. 3 is a longitudinal vertical section taken generally on the irregular line 3—3 of FIG. 1 looking in the direction of the arrows and with a portion of the wall of the plunger broken away in order to show the wrist pin connection of the drive to the plunger;

FIG. 5 is an enlarged detail view of the cushioning link between the plunger and the baler feeder;

Description of preferred embodiment

Figure 1:
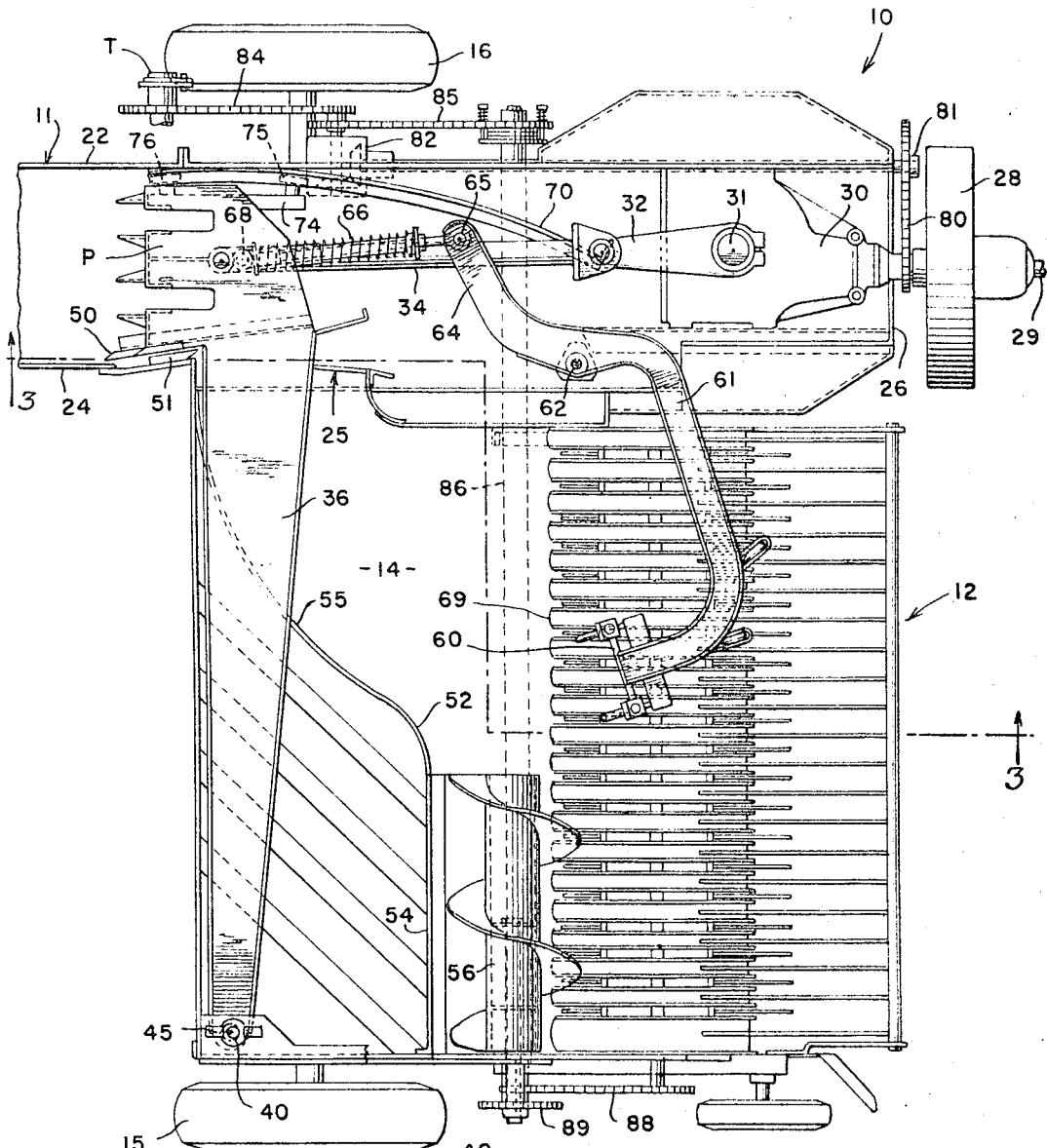
FIG. 1 is a plan section of a hay baler having a plunger mounted and constructed according to this invention; such section is taken approximately on the line 1—1 of FIG. 2 looking in the direction of the arrows.

Referring now to the drawings by numerals of reference, 10 denotes generally a hay baler having a fore-and-aft extending bale case 11, a conventional transversely extending pickup 12, an infeed chamber 14 and laterally spaced ground wheels 15 and 16. Bale case 11 has a top wall 20, a bottom wall 21, and side walls 22 and 24. Side wall 24 has an infeed opening 25 through which hay is fed into the bale case from the feed chamber 14.

Figure 4:
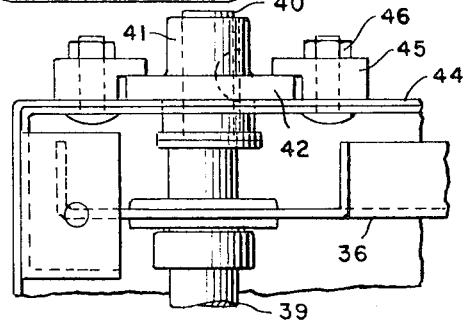
FIG. 4 is an enlarged fragmentary vertical elevation of the pivot pin which supports the plunger and illustrating the eccentric mounting for adjusting the position of the pin and thus the plunger.

At the forward end 26 of the bale case there is a flywheel 28 which receives power through a connection 29 to the tractor, not shown, which tows baler 10 in the field toward the right of FIGS. 1–3. Power is transmitted rearwardly from the flywheel to a gearbox 30 supported on the bale case and having a vertically extending output shaft 31 to which a crank arm 32 is connected. Crank arm 32 rotates above gearbox 30 in a horizontal plane about the vertical axis of shaft 31; and it is pivotally connected to a connecting rod 34 which is in turn pivotally connected by a wrist pin 35 to a plunger P. The plunger P is carried on a pair of horizontally extending, vertically spaced arms, namely upper arm 36 and lower arm 38. At the ends of the arms remote from plunger P the arms are pivotally connected to a vertical pin 39 at a location widely spaced from side wall 24 of the bale case. Pin 39 is located adjacent the outboard right end of pickup 12 and rearwardly thereof. At its upper and lower ends, pivot pin 39 has an eccentric stub shaft 40 (FIG. 4) keyed to a collar 41 and plate 42 adapted to be clamped to baler frame plates 44 by means of clamp elements 45 and bolt-nut means 46.

Plunger P oscillates in a horizontal plane about the axis of the vertical pivot pin 39. The plunger has a vertical knife 50 which cooperates with a vertical stationary shear bar 51 on bale case side wall 24 adjacent the rearward edge of infeed opening 25. By rotatably adjusting pivot pin 39, plunger P is moved toward or away from bale case wall 24 and the operative relationship of plunger knife 50 with shear bar 51 is easily established. Once a proper operating clearance has been obtained, the pivot pin is locked in place and provides a fixed axis about which the plunger oscillates.

Rearwardly of the pickup 12, an upright feeder wall 52 is provided having a forward portion 54 adjacent the pickup and then a section 55 which curves rearwardly and laterally toward the shear bar 51 on the bale case. To move crop material delivered rearwardly from the pickup and laterally toward the bale case, an auger 56 is provided. Auger 56 is behind the outboard side of the pickup and it operates to deliver hay to chamber 14 where it is fed into the bale case by an oscillating feeder 60. Feeder 60 comprises a C-shaped arm 61 supported by pivot 62 on bale case 10 and having an end 64 pivotally connected at 65 to a telscopic spring link arm 66 (FIGS. 1, 3 and 5) connected by pin 68 to the rearward end of connecting rod 34. The end of arm 61 overlying pickup 12 and the floor of feed chamber 14 has pivotable feeder tines 9 which stand erect when travelling toward feed opening 25 and pivot to a horizontal position on a return stroke. Such structure is generally conventional and well known in the baler feeder art.

Connected to bale case 10 is an arcuate track 70 concentric to the axis of pin 39 and having upper and lower track members 71 and 72 as shown in FIG. 3. The plunger P has a fixed horizontal arm 74 which carries fore-and-aft spaced rollers 75 and 76 which travel between the rails 71 and 72 of track 70. These rollers prevent tilting of plunger P as it oscillates; and as shown in FIG. 3, the track is located adjacent the bottom wall 21 of the bale case.

Between flywheel 28 and gear box 30, a chain drive 80 is provided to a fore-and-aft extending drive shaft 81 which transmits power to a gearbox 82. The gearbox has a chain 84 to the tying mechanism T of the baler and a chain drive chain 85 to a cross shaft 86 to the outboard side of the baler from which a chain 88 drives the pickup 12 and a chain 89 operates the auger 56.

Figure 6:
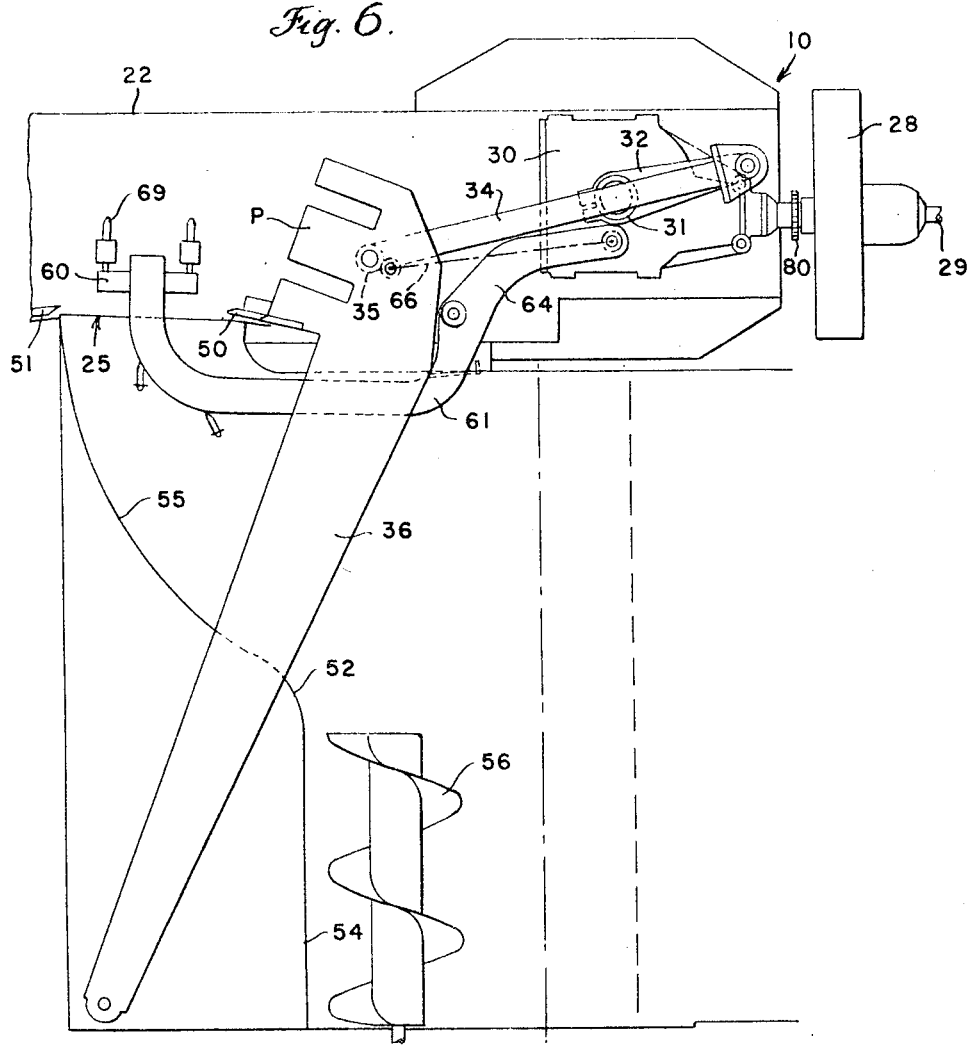
FIG. 6 is a view similar to FIG. 1 but showing the baler diagrammatically and with the plunger retracted and the feeder extended.

In operation, as the baler 10 travels across the ground G toward the right of FIGS. 1, 2 and 3, pickup 12 rotating in a counterclockwise direction operates to engage windrowed crop material and such material is elevated rearwardly toward auger 56 and feed chamber 14. Auger 56 conveys any material on the right side of the pickup laterally inwardly and the oscillating feeder mechanism 60 travels from the retracted position shown in FIG. 1 to the extended infeed position shown in FIG. 6 to sweep the material across chamber 14 and into the bale case, At the same time, the plunger P moves from the compression position shown in FIG. 1 to the retracted position shown in FIG. 6. When the feeder retracts from the position shown in FIG. 6 and the plunger P moves forwardly, the plunger effectively engages the material in the bale case and forces it rearwardly to compress the hay into a bale. The inter-engagement of plunger knife 50 with the shear bar 51 severs the hay into separate wads.

As plunger P oscillates about the vertical axis of the pivot pin 39, the lower arm 38 swings below feed chamber 14 and the upper arm 36 sweeps in vertically spaced relation thereto. The feeder 60 operates between these two arms to deliver the crop material through the infeed opening 25, FIG. 6.

Since the plunger travel is controlled by the axis of the vertical pivot pin 39, its concentric path is fixed. Further, the drive to the plunger from the crank arm 32 travelling in a horizontal plane develops no upward or downward forces on the plunger as it oscillates. As a result, track 70 and the rollers 75—76 thereon are relegated nearly to a supporting function for plunger P and they do not serve to guide it. The guiding results from the fixed axis of the pivot pin. Because of this arrangement, the mass of the plunger head can be less than that ordinarily required of plungers in conventional balers. Because the weight of the plunger head is low, it can be driven at higher speeds than a conventional baler plunger whereby high capacity and better bale shape may be obtained.

Further, the lighter plunger head is less costly to manufacture, assemble and repair. Also the position of the plunger knife 50 relative to shear bar 51 is easily obtained by the eccentric adjustment of pin 39.

Figure 7:
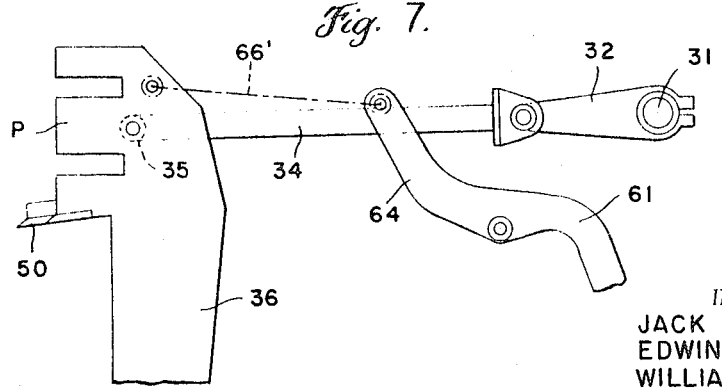
FIG. 7 is an alternate connection of the feeder to the plunger head itself, rather than to the plunger connecting rod.

In FIG. 7 a link 66' is shown between feeder arm 61 and the body of plunger P instead of being connected to rod 34. Either connection is suitable. Also, although an auger 56 and a particular feeder 60 is shown, a different feeder could be employed.

Having thus described our invention, what we claim is:

1. A hay baler comprising a mobile frame, a bale case on said frame extending in a horizontal direction and haivng a feed opening in a side wall thereof, a hay receiving chamber on said frame along side said bale case into which hay is deposited, feeder means for moving hay through said chamber and into said bale case through said opening, a plunger in said bale case and movable back and forth across said opening to compress hay into bales, a vertical pivot pin on said baler at the opposite side of said feeder means from said opening, means connecting said plunger to said pivot pin and extending passed said opening and along said chamber for arcuate oscillating movement in a horizontal plane about the vertical axis of said pin, and drive means for operating said plunger.

2. A hay baler as recited in claim 1 wherein said bale case has a fixed shear bar extending in a vertical direction adjacent said feed opening and said plunger has a knife attached thereto and cooperative with said shear bar, and adjustment means for varying the arc of travel of said plunger whereby proper operating clearance may be established between said knife and said shear bar.

3. A hay baler as recited is claim 2 wherein said adjustment means comprises an eccentric connection between said pivot pin and the baler whereby the axis of rotation of the pin may be shifted relative to said bale case.

4. A hale baler as recited in claim 1 wherein said bale case has a horizontal arcuate track affixed thereto concentric to the axis of said pin, and said plunger has guide and support means movable over said track.

5. A hay baler as recited in claim 4 wherein said guide and support means comprises a pair of spaced rollers carried on an arm affixed to said plunger, said rollers traveling on said track and resisting tilting of said plunger as it oscillates.

6. A hay baler as recited in claim 5 wherein said track comprises a pair of parallel horizontal arcuate rails vertically spaced from each other and between which said rollers travel.

7. A hay baler as recited in claim 4 wherein said track is located adjacent a lower portion of said bale case and said plunger.

8. A hay baler as recited in claim 1 wherein said means connecting said plunger to said pivot pin comprises a pair of horizontally extending, vertically spaced arms, one of said arms connecting to said plunger adjacent the top thereof and the other of said arms connecting to the plunger adjacent the bottom thereof.

9. A hay baler as recited in claim 8 wherein said one arm extends adjacent the top of said hay receiving platform and said other arm swings below the chamber.

10. A hay baler as recited in claim 1 wherein said plunger drive means comprises a crank arm rotatable on a vertical axis parallel to said pivot pin and a connecting rod having a vertical pivot connection to said crank arm and a vertical pivot connection to said plunger whereby the connecting rod moves in a horizontal plane.

11. A hay baler comprising a horizontal bale case having a feed opening in a wall thereof through which hay is delivered into said bale case in a given direction, a plunger movable back and forth in said bale case for a substantial portion of its movement across said opening to compress hay into bales, a vertical pivot pin on said baler and spaced from said bale case on the side of said feed opening, means connecting said plunger to said pivot pin and extending passed said opening in direction of delivery of hay for arcuate oscillating movement in a horizontal plane about the vertical axis of said pin, and drive means for operating said plunger.

12. A hay baler as recited in claim 11 wherein said drive means moves in a horizontal plane.

References Cited

UNITED STATES PATENTS

| | | | |
|---|---|---|---|
| 2,487,938 | 11/1949 | Nikkel | 100—141 XR |
| 3,115,823 | 12/1963 | Nolt et al. | 100—142 |
| 3,134,321 | 5/1964 | Loehnert | 100—98 |
| 3,174,425 | 3/1965 | Eby et al. | 100—142 XR |

FOREIGN PATENTS 757,969   9/1956   Great Britain.

PETER FELDMAN, Primary Examiner

U.S. Cl. X.R.

100—98, 189